United States Patent Office 2,875,175
Patented Feb. 24, 1959

2,875,175

SUBSTITUTED THIOCARBAMYL -P- PHENYLENE-DIAMINES AS ANTI-OZONE AGENTS FOR RUBBER

Joseph C. Ambelang, Akron, Ohio, assignor to The Firestone Tire & Rubber Company, Akron, Ohio, a corporation of Ohio No Drawing. Application October 15, 1954
Serial No. 462,622

13 Claims. (Cl. 260—45.9)

This invention relates to inhibiting the deteriorating action of ozone on vulcanized rubber compositions. It includes rubber compositions which contain new antiozonants and the method of curing rubber compositions with the antiozonants. The rubber compositions can be those used in tires, inner tubes, rubber thread, and other products produced from rubber latexes, and other rubber articles. The compositions consist essentially of natural rubber, or a synthetic rubber, e. g., polymer of butadiene or an alkyl derivative thereof, or copolymer of butadiene or an alkyl derivative thereof with a vinyl co-monomer, or a mixture of such rubbers.

The deterioration of rubber is due to various factors and is evidenced in different ways. The inhibitors of this invention have been found to absorb or destroy ozone, and thus prevent its deteriorating action on rubber. These antiozone agents are substituted thiocarbamyl-p-phenyl-enediamines. They have the formula:

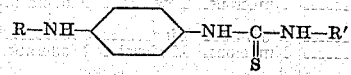

in which R is from the class of substituents consisting of alkyl groups of one to ten carbon atoms, cyclopentyl, cyclohexyl, alkyl-substituted cyclopentyl and alkyl-substituted cyclohexyl; and R' is from the class consisting of alkyl groups containing one to ten carbon atoms, cyclopentyl, cyclohexyl, alkyl-substituted cyclopentyl, alkyl-substituted cyclohexyl, phenyl and phenyl substituted with a hydrocarbon group of one to ten carbon atoms, e. g. tolyl, xylyl, ethylphenyl, octylphenyl, etc. The alkyl substituents can be straight chain or branched chain. Thus, the antiozone agents of this invention include compounds of the above general formula in which the following substituents are used for R and R', as indicated, in any combination:

R

| Methyl | Any heptyl |
|---|---|
| Ethyl | Any octyl |
| Either propyl | Any nonyl |
| Any butyl | Any decyl |
| Any pentyl | Cyclopentyl |
| Any hexyl | Cyclohexyl |

R'

| Ethyl | Any octyl |
|---|---|
| Methyl | Any nonyl |
| Either propyl | Any decyl |
| Any butyl | Cyclopentyl |
| Any pentyl | Cyclohexyl |
| Any hexyl | Phenyl |
| Any heptyl | |

Phenyl substituted with one or more hydrocarbon substituents of three to ten carbon atoms The foregoing are illustrative of the compounds that can be employed.

The foregoing compounds are most easily prepared from the appropriate substituted para-phenylenediamines and appropriate isothiocyanates. Typical preparations follows:

EXAMPLE 1

Equimolecular quantities of N-cyclohexyl-p-phenylenediamine and sec-hexylisothiocyanate were dissolved in 3 volumes of benzene and refluxed one hour. The reaction mixture was then cooled and a solid separated. On filtration, drying and recrystallizing from a benzene-toluene mixture a product melting at 174–175° C. was obtained. Analysis for nitrogen and sulfur identified the product as N-cyclohexyl-N'-sec-hexylthiocarbamyl - p - phenylenediamine.

EXAMPLE 2

Equimolecular quantities of N-n-butyl-p-phenylenediamine and n-butylisothiocyanate were dissolved in 2 volumes of benzene and refluxed 1½ hours. The oily product obtained by evaporating off the benzene was N-n-butyl-N'-n-butylthiocarbamyl-p-phenylenediamine.

EXAMPLE 3

Equimolecular quantities of N-cyclohexyl-p-phenylenediamine and n-butylisothiocyanate were dissolved in 2 volumes of benzene and refluxed for one hour. On cooling and dilution with petroleum ether, a colorless solid separated. On filtration, washing with heptane, and drying N-cyclohexyl-N'-n-butylthiocarbamyl-p-phenylenediamine was obtained. It melted at 128–132° C.

Oxygen and ozone both have a harmful effect on rubber, but the effect of each is different, and compounds which inhibit or prevent the harmful effect of one are not necessarily effective in stopping the harmful effect of the other.

Crabtree and Kemp in an article in Industrial and Engineering Chemistry, vol. 38, starting at page 278 (1946) explain the difference in the action of oxygen and ozone. The light-catalyzed oxidation which occurs during outdoor exposure forms a skin and crazed appearance over the exposed surface of the rubber. Ozone, even in very low concentration, induces cracking only in stretched rubber (C. H. Leigh-Dugmore, Rubber Age and Synthetics, November and December 1952), the cracks being perpendicular to the direction of stretch, and such cracking can occur in the absence of light.

As a matter of fact, the majority of the commercial rubber antioxidants have little, if any, effect in inhibiting the deterioration caused by ozone.

Tires are stressed when inflated. While a tire is at rest it is stretched statically, and on a moving vehicle it is stretched dynamically, i. e., it undergoes alternating stretching and relaxing. Some of the antiozone agents are more effective in static tests and others are more effective in dynamic tests. Antiozone agents effective under both conditions will be desired for tires, but for other rubber products an antiozone agent which does not meet both tests may be used.

The inhibiting effect of the antiozone agents of this invention in rubber was determined by treatment of un-aged, cured stocks with air of controlled ozone content in specially designed equipment and also by outdoor exposure to natural weathering. The tests were conducted with one-half inch dumbbell samples of approximately 100 gauge thickness. The special apparatus for testing with air of controlled ozone content and the method of testing therein are described in the articles by Ford and Cooper, appearing in India Rubber World for September and October 1951, entitled "A Study of the Factors Affecting the Weathering of Rubber-like Materials—I and II." The following reports refer to tests in which the ozone concentration was maintained at 60 parts per 100,000,000 parts of air for 7 hours at 95° F. Two types of tests were conducted. In one type—called the dynamic test—the sample was repeatedly stretched between the limits of 0 to 20 percent elongation at the rate of 108 cycles per minute. In the other type of test—the static test—the samples were stretched at 12.5 percent elongation throughout the test. No special lights were used in either test. On completion of each test the number and size of the cracks in each sample were compared visually with the number and size of the cracks in a blank which contained no antiozone agent and which was cured and tested at the same time as the test sample. The number of cracks was reported on an arbitrary scale as "none," "very few," "few," "moderate," "moderate to numerous," and "numerous," and the size of the cracks was reported according to an arbitrary scale of measuring as "none," "very fine," "fine," "medium," "coarse," and "very coarse."

The reported results include data on the tensile properties of the cured rubber stocks before and after aging 2 days in an oven at 212° F. The modulus and tensile strength are given in pounds per square inch and the elongation is reported as percent of stretch at the break. These data are included to show that the antiozone agents have no substantial deleterious effect on the cure or upon the aging of the cured stocks.

The antiozone agents were tested in stock such as that which might be used in tire sidewalls, compounded according to the following formula:

| | Parts by weight |
|---|---|
| GR-S | 100 |
| Sulfur | 2 |
| Carbon black | 45 |
| Softener | 10 |
| Accelerator | 1.3 |
| Zinc oxide | 3 |

All blanks and test samples were cured 60 minutes at 280° F.

In all of the test samples, both those tested in the special apparatus described and those subjected to natural outdoor weathering, 2.0 parts by weight of the antiozone agent were added to the blank formula for each 100 parts of GR-S present. Any substantial small amount may be employed; and this may vary, for example, from 0.2 part by weight to 10 parts by weight, depending upon the use to be made of the rubber composition.

For brevity, in the following table the various antiozone agents are identified as follows:

Compound A: N-n-butyl-N'-sec-hexylthiocarbamyl-p-phenylenediamine

Compound B: N-n-butyl-N'-n-butylthiocarbamyl-p-phenylenediamine.

Compound C: N-n-butyl-N'-phenylthiocarbamyl-p-phenylenediamine

Compound D: N-cyclohexyl-N'-sec-hexylthiocarbamyl-p-phenylenediamine

Compound E: N-cyclohexyl-N'-n-butylthiocarbamyl-p-phenylenediamine

Each table gives first, the composition of the vulcanized rubber tested in parts by weight, referring back to the foregoing formula for the composition of the control. Physical data on the vulcanized compounds are included to show that the antiozone agent has no deleterious effect on the composition. Data on the ozone tests follows.

Table No. 1

| | | | | |
|---|---|---|---|---|
| Control | 161.3 | 161.3 | 161.3 | 161.3 |
| Compound A | | 2. | | |
| Compound B | | | 2. | |
| Compound C | | | | 2. |
| Total | 161.3 | 163.3 | 163.3 | 163.3 |
| Physical Properties: | | | | |
| 300% Modulus | 1,450 | 1,400 | 1,475 | 1,450. |
| Tensile | 1,975 | 2,375 | 2,300 | 2,400. |
| Elongation | 380 | 470 | 440 | 465. |
| Natural Weathering: | | | | |
| Days to Initial Cracking | 14 | 122+ | 122+ | 122+. |
| Total Days Exposure | 122 | 122 | 122 | 122. |
| Cracking at End— | | | | |
| Size | Coarse | (*) | (*) | (*). |
| Number | Numerous | None | None | None. |
| Artificial Weathering: | | | | |
| Static— | | | | |
| Size | Medium | Fine | Fine | Medium. |
| Number | Numerous | Few | Moderate | Moderate. |
| Dynamic— | | | | |
| Size | Medium | Fine | Fine | Medium. |
| Number | Numerous | Moderate | Moderate | Numerous. |

*Indicates a craze, no cracking.

In the foregoing test, the appearance of cracking on natural weathering was postponed from the fourteenth to over one hundred twenty-two days of exposure, and cracking was eliminated. In the weathering machine, in an atmosphere enriched with ozone, less cracking occurred in the test samples than in the control.

Table No. 2

| | | |
|---|---|---|
| Blank | 161.3 | 61.3, |
| Compound D | | * 2. |
| Total | 161.3 | 163.3. |
| Physical Properties: | | |
| 300% Modulus | 1,375 | 1,425. |
| Tensile | 2,200 | 2,200. |
| Elongation | 450 | 425. |
| Natural Weathering: | | |
| Days to Initial Cracking | 14 | 122. |
| Total Days Exposure | 122 | 122. |
| Cracking at End— | | |
| Size | Coarse | (*). |
| Number | Numerous | None. |
| Artificial Weathering: | | |
| Static— | | |
| Size | Coarse | Medium. |
| Number | Moderate to Numerous. | Very fine. |
| Dynamic— | | |
| Size | Medium | Very fine. |
| Number | Numerous | Very few. |

* Indicates a craze, no cracking.

The antiozone agent materially reduced the cracking in both the natural weathering and artificial weathering tests.

Table No. 3

| | | |
|---|---|---|
| Blank | 161.3 | 161.3 |
| Compound E | | 2 |
| Total | 161.3 | 163.3 |
| Physical Properties: | | |
| 300% Modulus | 1,325 | 1,225 |
| Tensile | 2,100 | 2,075 |
| Elongation | 430 | 470 |
| Natural Weathering: | | |
| Days to Initial Cracking | 20 | 40 |
| Total Days Exposure | 40 | 40 |
| Cracking at End— | | |
| Size | Medium | Medium |
| Number | Numerous | Very few |
| Artificial Weathering: | | |
| Static— | | |
| Size | Medium | Medium |
| Number | Numerous | Moderate to Numerous |
| Dynamic— | | |
| Size | Medium | Medium |
| Number | Numerous | Numerous |

The antiozone agent doubled the time elapsed before the first cracks appeared, hence repressed the formation of ozone cracks.

By sulfur-vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including the dialkylamine polysulfides and reaction products of primary amines with excess sulfur. Known vulcanization accelerators are useful in speeding up the vulcanization process and operative herein, especially the relatively active accelerators including the thiazole sulfenamides, e. g., N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-disubstituted dithiocarbamates, the thiuram sulfides, the xanthogen sulfides, and metallic salts of mercaptothiazoles or mercaptothiazolines or dithiocarbamic acids.

One or more accelerator activators is often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra-accelerator by allowing the film to remain at room temperature for several hours or a few days.

I claim:

1. A sulfur-vulcanized rubber composition, the rubber being essentially a rubber of the class consisting of natural rubber, polymers of butadiene and alkyl derivatives thereof, and mixtures thereof, which composition includes as an antiozone agent a small amount of N-cyclohexyl-N'-sec.-hexylthiocarbamyl-p-phenylene-diamine.

2. The method of curing rubber from the class consisting of natural rubber, polymers of butadiene and alkyl derivatives thereof, and mixtures of such rubbers, which method comprises curing the rubber with sulfur in the presence of a small amount of N-cyclohexyl-N'-sec.-hexylthiocarbamyl-p-phenylene-diamine as an antiozone agent.

3. A sulfur-vulcanized rubber composition which includes as an antiozone agent a small amount of a substance of the formula

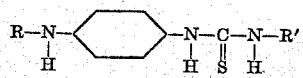

wherein R is from the class of substituents consisting of alkyl groups of 1 to 10 carbon atoms, cyclopentyl, cyclohexyl, alkyl-substituted cyclopentyl and alkyl-substituted cyclohexyl; and R' is from the class consisting of alkyl groups containing 1 to 10 carbon atoms, cyclopentyl, cyclohexyl, alkyl-substituted cyclopentyl, alkyl-substituted cyclohexyl, phenyl and phenyl substituted with a hydrocarbon group of one to ten carbon atoms; the rubber being from the class consisting of natural rubber, polymers of butadiene and alkyl derivatives thereof, and mixtures of such rubbers.

4. A sulfur-vulcanized rubber composition of claim 3 in which R of the formula is n-butyl.

5. A sulfur-vulcanized rubber composition which includes as an antiozone agent a small amount of N-n-butyl-N'-sec.-hexylthiocarbamyl-p-phenylenediamine, the rubber being from the class consisting of natural rubber, polymers of butadiene and alkyl derivatives thereof, and mixtures of such rubbers.

6. A sulfur-vulcanized rubber composition which includes as an antiozone agent a small amount of N-n-butyl - N' - n-butylthiocarbamyl-p-phenylenediamine, the rubber being from the class consisting of natural rubber, polymers of butadiene and butadiene and alkyl derivatives thereof, and mixtures of such rubbers.

7. A sulfur-vulcanized rubber composition which includes as an antiozone agent a small amount of N-n-butyl - N' - phenylthiocarbamyl-p-phenylenediamine, the rubber being from the class consisting of natural rubber, polymers of butadiene and alkyl derivatives thereof, and mixtures of such rubbers.

8. A sulfur-vulcanized rubber composition of claim 3 in which R of the formula is cyclohexyl.

9. A sulfur-vulcanized rubber composition which includes as an antiozone agent a small amount of N-cyclohexyl-N'-sec.-hexylthiocarbamyl-p-phenylenediamine, the rubber being from the class consisting of natural rubber, polymers of butadiene and alkyl derivatives thereof, and mixtures of such rubbers.

10. A sulfur-vulcanized rubber composition which includes as an antiozone agent a small amount of N-cyclohexyl - N' - n-butylthiocarbamyl-p-phenylenediamine, the rubber being from the class consisting of natural rubber, polymers of butadiene and alkyl derivatives thereof, and mixtures of such rubbers.

11. The method of curing rubber which comprises sulfur-curing the same in the presence of a small amount of a substance of the formula

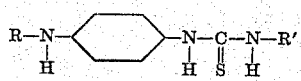

wherein R is from the class of substituents consisting of alkyl groups of 1 to 10 carbon atoms, cyclopentyl, cyclohexyl, alkyl-substituted cyclopentyl and alkyl-substituted cyclohexyl; and R' is from the class consisting of alkyl groups containing 1 to 10 carbon atoms, cyclopentyl, cyclohexyl, alkyl-substituted cyclopentyl, alkyl-substituted cyclohexyl, phenyl and phenyl substituted with a hydrocarbon group of one to ten carbon atoms; the rubber being of the class consisting of natural rubber, polymers of butadiene and alkyl derivatives thereof, and mixtures of such rubbers.

12. The method of curing rubber as in claim 11 in which R of the formula is n-butyl.

13. The method of curing rubber as in claim 11 in which R of the formula is cyclohexyl.

References Cited in the file of this patent
UNITED STATES PATENTS

| | | |
|---|---|---|
| 1,356,495 | Scott | Oct. 19, 1920 |
| 1,514,571 | Sebrell | Nov. 4, 1924 |
| 2,496,941 | Hardman | Feb. 7, 1950 |
| 2,702,821 | Huebner et al. | Feb. 22, 1955 |
| 2,703,815 | Huebner et al. | Mar. 8, 1955 |

UNITED STATES PATENT OFFICE
CERTIFICATION OF CORRECTION

Patent No. 2,875,175                 February 24, 1959

Joseph C. Ambelang

It is hereby certified that error appears in the above numbered patent requiring correction and that the said Letters Patent should read as corrected below.

Column 4, Table No. 2, third column thereof and opposite "Days to Initial Cracking", for "122" read -- 122+ --; column 6, line 37, strike out "and butadiene".

Signed and sealed this 8th day of August 1961.

(SEAL)
Attest:

ERNEST W. SWIDER
Attesting Officer

DAVID L. LADD
Commissioner of Patents